United States Patent
Kurimoto et al.

(10) Patent No.: US 10,215,325 B2
(45) Date of Patent: Feb. 26, 2019

(54) HEAT INSULATION MATERIAL AND METHOD OF MANUFACTURING HEAT INSULATION MATERIAL

(71) Applicant: NICHIAS CORPORATION, Tokyo (JP)

(72) Inventors: Yoshiro Kurimoto, Tokyo (JP);
Shigeru Nakama, Tokyo (JP);
Kazuhisa Watanabe, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 14/895,855

(22) PCT Filed: Jun. 3, 2014

(86) PCT No.: PCT/JP2014/064726
§ 371 (c)(1),
(2) Date: Dec. 3, 2015

(87) PCT Pub. No.: WO2014/196526
PCT Pub. Date: Dec. 11, 2014

(65) Prior Publication Data
US 2016/0123519 A1 May 5, 2016

(30) Foreign Application Priority Data
Jun. 4, 2013 (JP) .................................. 2013-117843

(51) Int. Cl.
*F16L 59/02* (2006.01)
*B29C 70/46* (2006.01)
(Continued)

(52) U.S. Cl.
CPC ............ *F16L 59/028* (2013.01); *B29C 70/12* (2013.01); *B29C 70/30* (2013.01); *B29C 70/46* (2013.01);
(Continued)

(58) Field of Classification Search
CPC ...... F16L 59/028; F16L 59/029; B29C 70/30; B29C 70/46; B29C 70/12; B29C 43/203; (Continued)

(56) References Cited

U.S. PATENT DOCUMENTS 3,897,588 A 7/1975 Nohtomi
4,279,952 A 7/1981 Kodama et al.

FOREIGN PATENT DOCUMENTS

JP 58-29129 Y2 6/1983
JP 61-109205 A 5/1986
(Continued)

OTHER PUBLICATIONS

Machine Translation of JP H07-32532. 1995.*
(Continued)

*Primary Examiner* — Brain Handville
(74) *Attorney, Agent, or Firm* — Westerman, Hattori, Daniels & Adrian, LLP

(57) ABSTRACT

A thermal insulation material can suitably be used as a thermal insulation material for a hot press, a rubber vulcanizing machine, and an injection molding machine, a casing for an induction furnace, and the like, and exhibits good workability, excellent heat resistance, excellent mechanical strength, excellent toughness, excellent working accuracy, excellent thickness accuracy, and the like. The thermal insulation material is produced by hot-pressing a plurality of prepregs in a state in which the plurality of prepregs are stacked, each of the plurality of prepregs being obtained by impregnating heat-resistant paper with a thermosetting resin, the thermal insulation material including 32 to 64 mass % of a fibrous material and 36 to 68 mass % of the thermosetting resin.

17 Claims, 1 Drawing Sheet

(51) Int. Cl.
  *B29C 70/12* (2006.01)
  *B32B 5/26* (2006.01)
  *B29C 70/30* (2006.01)
  *B32B 17/06* (2006.01)
  *B32B 37/06* (2006.01)
  *B32B 38/00* (2006.01)
  *B29C 43/20* (2006.01)
  *B29K 309/08* (2006.01)
  *B29K 701/10* (2006.01)
  *B29L 7/00* (2006.01)

(52) U.S. Cl.
  CPC .............. *B32B 5/26* (2013.01); *B32B 17/067* (2013.01); *B32B 37/06* (2013.01); *B32B 38/004* (2013.01); *F16L 59/029* (2013.01); *B29C 43/203* (2013.01); *B29K 2309/08* (2013.01); *B29K 2701/10* (2013.01); *B29K 2995/0015* (2013.01); *B29K 2995/0082* (2013.01); *B29L 2007/002* (2013.01); *B32B 2038/0076* (2013.01); *B32B 2260/023* (2013.01); *B32B 2260/046* (2013.01); *B32B 2262/101* (2013.01); *B32B 2305/076* (2013.01); *B32B 2307/304* (2013.01); *B32B 2307/54* (2013.01); *B32B 2315/085* (2013.01)

(58) Field of Classification Search
  CPC ........ B29K 2701/10; B29K 2995/0082; B29K 2309/08; B29K 2995/0015; B29L 2007/002; B32B 17/067; B32B 37/06; B32B 38/004; B32B 5/26; B32B 2305/076; B32B 2315/085; B32B 2038/0076; B32B 2260/046; B32B 2260/023; B32B 2262/101; B32B 2307/304; B32B 2307/54
  See application file for complete search history.

(56) References Cited

FOREIGN PATENT DOCUMENTS

| | | |
|---|---|---|
| JP | 4-30042 Y2 | 7/1992 |
| JP | 6-190962 A | 7/1994 |
| JP | 7-32532 A | 2/1995 |
| JP | 2607670 B2 | 5/1997 |
| JP | 2000-1599 A | 1/2000 |
| JP | 2002-105223 A | 4/2002 |
| JP | 2006-316901 A | 11/2006 |
| JP | 2008-196552 A | 8/2008 |
| JP | 2009-185411 A | 8/2009 |
| JP | 2012-166358 A | 9/2012 |
| JP | 2013-10344 A | 1/2013 |
| JP | 2013-56473 A | 3/2013 |
| KR | 10-2005-0013503 A | 2/2005 |

OTHER PUBLICATIONS

Machine Translation of JP 2000-001599. (Year: 2000).*
Office Action dated Sep. 5, 2016, issued in counterpart Chinese Patent Application No. 201480031919.5, with English translation. (14 pages).
International Search Report dated Sep. 2, 2014, issued in counterpart application No. PCT/JP2014/064726 (2 pages).
Extended (supplementary) European Search Report dated Jan. 5, 2017, issued in counterpart European Application No. 14808218.3. (7 pages).
Office Action dated Sep. 1, 2017, issued in counterpart Korean Application No. 10-2015-7034251, with English translation. (10 pages).
Office Action dated Sep. 17, 2018, issued in counterpart Korean Application No. 10-2015-7034251, with English anslation. (8 pages).
Office Action dated Mar. 19, 2018, issued in counterpart Korean Application No. 10-2015-7034251, with English anslation. (8 pages).

* cited by examiner

HEAT INSULATION MATERIAL AND METHOD OF MANUFACTURING HEAT INSULATION MATERIAL

TECHNICAL FIELD

The present invention relates to a thermal insulation material and a method for producing a thermal insulation material.

BACKGROUND ART

For example, a thermal insulation material produced by binding a talc powder and pulp using Portland cement is known as a thermal insulation material which is cut prior to use to have a shape corresponding to a device shape or the like, and for which high strength is required during use (e.g., a thermal insulation material that is used as a thermal insulation material for a hot press, a rubber vulcanizing machine, and an injection molding machine, and a casing for an induction furnace) (see Patent Document 1 (JP-A-61-109205)).

However, since the above thermal insulation material is produced using only pulp as reinforced fibers, the above thermal insulation material shows a significant decrease in mechanical strength and a significant dimensional change due to heating, and exhibits insufficient toughness. Specifically, the above thermal insulation material exhibits good cutting workability, but cracks and breakage (chipping) easily occur when a high load or an impact load is applied to the thermal insulation material.

Patent Document 2 (JP-A-2012-166358) discloses a composite sheet having a thickness of 3 mm that is formed by bringing two glass wool prepreg mats including an uncured urea-phenolic resin and having a thickness of 50 mm into contact with each other to obtain a laminate, and compression-molding the laminate at 200° C. for 5 minutes in a state in which melamine resin-impregnated paper having a thickness of 0.1 mm is provided on each side of the laminate.

However, the composite sheet disclosed in Patent Document 2 is designed for use as a decorative sheet, and it is difficult to use the composite sheet disclosed in Patent Document 2 as a thermal insulation material for a hot press, a rubber vulcanizing machine, and an injection molding machine due to poor toughness and bending strength.

Therefore, a thermal insulation material that exhibits excellent toughness, higher bending strength, and excellent thickness accuracy has been desired.

RELATED-ART DOCUMENT

Patent Document

Patent Document 1: JP-A-61-109205
Patent Document 2: JP-A-2012-166358

SUMMARY OF THE INVENTION

Technical Problem

An object of the invention is to provide a thermal insulation material that exhibits good workability, excellent heat resistance, excellent mechanical strength, excellent toughness, excellent working accuracy, excellent thickness accuracy, and the like, and a method that can easily produce the thermal insulation material.

Solution to Problem

The inventors of the invention conducted extensive studies in order to solve the above technical problem. As a result, the inventors found that the above technical problem can be solved by a thermal insulation material that is produced by hot-pressing a plurality of prepregs in a state in which the plurality of prepregs are stacked, each of the plurality of prepregs being obtained by impregnating heat-resistant paper with a thermosetting resin, the thermal insulation material including 32 to 64 mass % of a fibrous material and 36 to 68 mass % of the thermosetting resin. This finding has led to the completion of the invention.

Several aspects of the invention provide the following.
(1) A thermal insulation material produced by hot-pressing a plurality of prepregs in a state in which the plurality of prepregs are stacked, each of the plurality of prepregs being obtained by impregnating heat-resistant paper with a thermosetting resin,
the thermal insulation material including 32 to 64 mass % of a fibrous material and 36 to 68 mass % of the thermosetting resin.
(2) The thermal insulation material according to (1), the thermal insulation material being produced by hot-pressing the plurality of prepregs so that each of the plurality of prepregs has an average thickness of 0.05 to 3.0 mm.
(3) The thermal insulation material according to (1) or (2), wherein the heat-resistant paper is paper made of glass fibers.
(4) The thermal insulation material according to any one of (1) to (3), wherein the plurality of prepregs are hot-pressed so that the number of prepregs stacked per 10 mm (thickness) of the thermal insulation material is 3 to 200.
(5) The thermal insulation material according to any one of (1) to (4), having a thermal conductivity of 0.25 W/(m·K) or less.
(6) A method for producing a thermal insulation material including:
stacking a plurality of prepregs obtained by impregnating heat-resistant paper with a thermosetting resin, each of the plurality of prepregs including 32 to 64 mass % of a fibrous material and 36 to 68 mass % of the thermosetting resin, and having an average thickness of 0.2 to 6 mm; and
hot-pressing the plurality of prepregs at a temperature equal to or higher than the curing temperature of the thermosetting resin.
(7) The method for producing a thermal insulation material according to (6), wherein the plurality of prepregs are hot-pressed so that each of the plurality of prepregs has an average thickness of 0.05 to 3.0 mm.
(8) The method for producing a thermal insulation material according to (6) or (7), wherein the heat-resistant paper is paper made of glass fibers.
(9) The method for producing a thermal insulation material according to any one of (6) to (8), wherein the plurality of prepregs are stacked so that the number of prepregs per 10 mm (thickness) of the thermal insulation material is 3 to 200.

Advantageous Effects of the Invention

The aspects of the invention thus provide a thermal insulation material that exhibits good workability, excellent heat resistance, excellent mechanical strength, excellent toughness, excellent working accuracy, excellent thickness accuracy, and the like, and a method that can easily produce the thermal insulation material.

DESCRIPTION OF EMBODIMENTS

Figure 1:
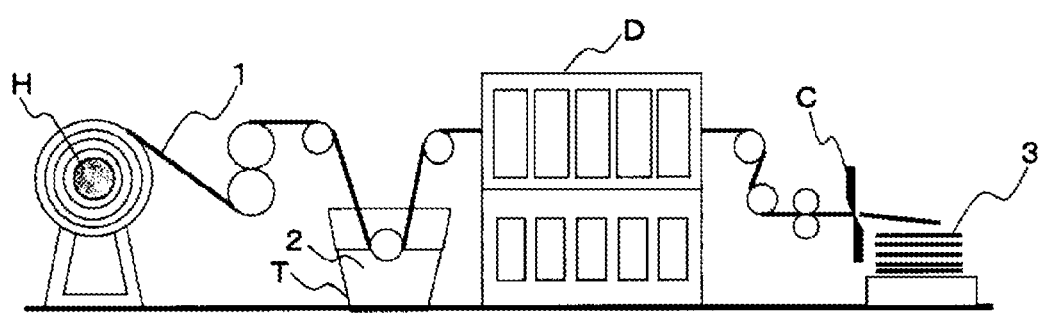
FIG. 1 is a schematic view illustrating an example of a process that produces a prepreg that is used to produce a thermal insulation material according to one embodiment of the invention.

A thermal insulation material according to one embodiment of the invention is produced by hot-pressing a plurality of prepregs in a state in which the plurality of prepregs are stacked, each of the plurality of prepregs being obtained by impregnating heat-resistant paper with a thermosetting resin, the thermal insulation material including 32 to 64 mass % of a fibrous material and 36 to 68 mass % of the thermosetting resin.

Examples of the heat-resistant paper used in connection with the thermal insulation material according to one embodiment of the invention include heat-resistant inorganic paper and heat-resistant organic paper. When the heat-resistant paper is heat-resistant inorganic paper, the inorganic paper includes inorganic fibers as the fibrous material. When the heat-resistant paper is heat-resistant organic paper, the organic paper includes organic fibers as the fibrous material.

The heat-resistant paper used in connection with the thermal insulation material according to one embodiment of the invention is preferably heat-resistant inorganic paper. The heat-resistant inorganic paper is produced by making paper from bulk inorganic fibers (to which a small amount of organic binder is appropriately added) using a papermaking machine. The heat-resistant inorganic paper exhibits good flexibility, and can be easily bent (can be used in a bent state).

Examples of the inorganic fibers included in the heat-resistant inorganic paper include glass fibers, silica fibers, alumina fibers, mullite fibers, silicon carbide fibers, rock wool, and the like.

Examples of the organic binder that may be included in the heat-resistant inorganic paper include one or more organic binders selected from an acrylic resin, polyvinyl alcohol, and the like.

Note that the heat-resistant inorganic paper may include a thermosetting resin as the organic binder. In this case, the organic binder is also used as the thermosetting resin included in the thermal insulation material (or prepreg).

The content of the inorganic fibers in the heat-resistant inorganic paper used in connection with the thermal insulation material according to one embodiment of the invention is preferably 45 to 100 mass %, more preferably 74 to 94 mass %, and still more preferably 82 to 88 mass %.

The content of the organic binder in the heat-resistant inorganic paper used in connection with the thermal insulation material according to one embodiment of the invention is preferably 0 to 55 mass %, more preferably 6 to 26 mass %, and still more preferably 12 to 18 mass %.

The average thickness of the heat-resistant paper used in connection with the thermal insulation material according to one embodiment of the invention is preferably 0.2 to 6 mm, more preferably 0.5 to 3 mm, and still more preferably 0.71 to 0.85 mm.

Note that the term "average thickness" used herein in connection with the heat-resistant paper refers to the arithmetic mean value of the thicknesses of the heat-resistant paper measured at eight arbitrary points using calipers or a micrometer.

The basis weight of the heat-resistant paper used in connection with the thermal insulation material according to one embodiment of the invention is preferably 20 to 430 $g/m^2$, more preferably 50 to 350 $g/m^2$, and still more preferably 100 to 120 $g/m^2$.

Note that the term "basis weight ($g/m^2$)" used herein in connection with the heat-resistant paper refers to a value calculated in accordance with JIS P 8124.

Specific examples of the heat-resistant paper used in connection with the thermal insulation material according to one embodiment of the invention include FINEFLEX (registered trademark) 1300 Paper-T (manufactured by Nichias Corporation), RAP-110C (manufactured by Oribest Co., Ltd.), and the like.

The thermal insulation material according to one embodiment of the invention is produced by hot-pressing a plurality of prepregs (that include the heat-resistant paper as a base) in a state in which the plurality of prepregs are stacked. Since the prepregs include the heat-resistant paper having a small thickness as a base, it is considered that the prepregs in which the thermosetting resin is homogeneously dispersed are hot-pressed while the occurrence of uneven heating (i.e., a variation in heating temperature) is suppressed.

It is considered that the thermal insulation material according to one embodiment of the invention thus exhibits good workability (working accuracy), excellent bending strength, excellent toughness, excellent thickness accuracy, and the like as compared with a thermal insulation material that includes a fibrous material and a thermosetting resin in the same amounts as those of the thermal insulation material according to one embodiment of the invention.

The thermosetting resin with which the heat-resistant paper used in connection with the thermal insulation material according to one embodiment of the invention is impregnated is not particularly limited.

Examples of the thermosetting resin include one or more thermosetting resins selected from a thermosetting resin binder such as a thermosetting phenolic resin, an epoxy resin, a melamine resin, a urea resin, an unsaturated polyester resin, an alkyd resin, a polyurethane resin, and a thermosetting polyimide resin.

When the thermosetting resin (with which the heat-resistant paper used in connection with the thermal insulation material according to one embodiment of the invention is impregnated) is obtained by thermally curing a thermosetting resin binder in the presence of a curing agent and a curing accelerator, the curing agent and the curing accelerator are also included in the thermosetting resin.

Examples of the curing agent include an amine such as hexamethylenetetramine, a phenolic resin curing agent, a peroxide such as an organic peroxide, and the like.

Examples of the curing accelerator include one or more curing accelerators selected from a phosphorus-based compound, a tertiary amine, imidazole, an organic acid metal salt, a Lewis acid, an amine complex salt, and the like.

The prepreg used in connection with the thermal insulation material according to one embodiment of the invention is obtained by impregnating the heat-resistant paper with the thermosetting resin.

The content of the fibrous material in the prepreg that is used to produce the thermal insulation material according to one embodiment of the invention is preferably 32 to 64 mass %, more preferably 37 to 46 mass %, and still more preferably 40 to 44 mass %.

The content of the thermosetting resin in the prepreg that is used to produce the thermal insulation material according to one embodiment of the invention is preferably 36 to 68 mass %, more preferably 54 to 63 mass %, and still more preferably 56 to 60 mass %.

The prepreg used in connection with the thermal insulation material according to one embodiment of the invention may include a powdery inorganic filler.

Examples of the inorganic filler include one or more inorganic fillers selected from silica, calcium carbonate, and the like.

When the prepreg used in connection with the thermal insulation material according to one embodiment of the invention includes an inorganic filler, it is possible to reinforce the prepreg, and easily control the density, the thermal conductivity, and the creeping properties of the prepreg within the desired ranges.

The content of the inorganic filler in the prepreg that is used to produce the thermal insulation material according to one embodiment of the invention is preferably 0 to 32 mass %, more preferably 5 to 20 mass %, and still more preferably 7 to 15 mass %.

The inorganic filler can be easily incorporated in the prepreg by impregnating the heat-resistant paper with the inorganic filler together with the thermosetting resin when producing the prepreg.

The average thickness of the prepreg used in connection with the thermal insulation material according to one embodiment of the invention is preferably 0.2 to 6 mm, more preferably 0.5 to 3 mm, and still more preferably 0.71 to 0.85 mm.

Note that the term "average thickness" used herein in connection with the prepreg refers to the arithmetic mean value of the thicknesses of the prepreg measured at eight arbitrary points using calipers or a micrometer.

The basis weight of the prepreg used in connection with the thermal insulation material according to one embodiment of the invention is preferably 30 to 690 $g/m^2$, more preferably 50 to 550 $g/m^2$, and still more preferably 210 to 230 $g/m^2$.

Note that the term "basis weight ($g/m^2$)" used herein in connection with the prepreg refers to a value calculated from the mass (g) of the prepreg having a square shape (100×100 cm).

The prepreg used in connection with the thermal insulation material according to one embodiment of the invention may be produced by immersing the heat-resistant paper in the thermosetting resin (and an optional inorganic filler and the like) put in an impregnation container, for example.

FIG. 1 is a schematic view illustrating an example of the process that produces the prepreg that is used to produce the thermal insulation material according to one embodiment of the invention.

In the example illustrated in FIG. 1, a heat-resistant paper 1 is drawn from a holder H (that holds the heat-resistant paper 1 in a wound state) using a roller or the like, immersed in a thermosetting resin 2 (and an optional inorganic filler and the like) put in an impregnation tank T to impregnate the heat-resistant paper 1 with a given amount of the thermosetting resin 2 (and an optional inorganic filler and the like), dried using a drier D, and cut using a cutter C to have a given size to produce the desired prepreg 3.

The thermal insulation material according to one embodiment of the invention is produced by hot-pressing a plurality of prepregs in a state in which the plurality of prepregs are stacked. Since the prepregs include the heat-resistant paper having a small thickness as a base, the prepregs also have a small thickness, and the thermosetting resin is homogeneously dispersed in the prepregs. It is considered that the prepregs are thus uniformly hot-pressed (see below) while the occurrence of uneven heating (i.e., a variation in heating temperature) is suppressed to produce the thermal insulation material according to one embodiment of the invention.

It is considered that the thermal insulation material according to one embodiment of the invention thus exhibits good workability, excellent bending strength, excellent toughness, excellent working accuracy, excellent thickness accuracy, and the like as compared with a thermal insulation material that includes a fibrous material and a thermosetting resin in the same amounts as those of the thermal insulation material according to one embodiment of the invention.

The thermal insulation material according to one embodiment of the invention is produced by hot-pressing a plurality of prepregs in a state in which the plurality of prepregs are stacked.

The number of prepregs that are hot-pressed to produce the thermal insulation material according to one embodiment of the invention is not particularly limited. The prepregs are preferably hot-pressed so that the number of prepregs per 10 mm (thickness) of the thermal insulation material is 3 to 200, more preferably 10 to 200, further more preferably 30 to 100, even more preferably 30 to 80, still more preferably 40 to 80, and particularly preferably 40 to 60.

The thermal insulation material according to one embodiment of the invention includes 32 to 64 mass % of the fibrous material, preferably includes 37 to 46 mass % of the fibrous material, and more preferably includes 40 to 44 mass % of the fibrous material.

When the heat-resistant paper used to produce the thermal insulation material according to one embodiment of the invention is heat-resistant inorganic paper, the fibrous material corresponds to fibers (e.g., inorganic fibers) included in the inorganic paper. When the heat-resistant paper used to produce the thermal insulation material according to one embodiment of the invention is heat-resistant organic paper, the fibrous material corresponds to fibers (e.g., organic fibers) included in the organic paper.

When the content of the fibrous material in the thermal insulation material according to one embodiment of the invention is within the above range, the thermal insulation material exhibits good workability, heat resistance, mechanical strength, toughness, and the like.

The thermal insulation material according to one embodiment of the invention includes 36 to 68 mass % of the thermosetting resin, preferably includes 54 to 63 mass % of the thermosetting resin, and more preferably includes 56 to 60 mass % of the thermosetting resin.

The thermosetting resin included in the thermal insulation material according to one embodiment of the invention functions as a binder that binds the fibrous material. When the content of the thermosetting resin in the thermal insulation material according to one embodiment of the invention is within the above range, the fibrous material derived from the heat-resistant paper is advantageously bound, and the thermal insulation material exhibits the desired heat resistance, mechanical strength, toughness, thickness accuracy, and the like.

The thermal insulation material according to one embodiment of the invention is preferably produced by hot-pressing the prepregs so that each of the prepregs has an average thickness of 0.05 to 3.0 mm, more preferably 0.05 to 0.28 mm, further more preferably 0.18 to 0.25 mm, and still more preferably 0.20 to 0.23 mm.

When the thermal insulation material according to one embodiment of the invention is produced by hot-pressing the prepregs so that each of the prepregs has an average thickness within the above range, the prepregs can be hot-pressed to have the desired thickness, and the thermal insulation material exhibits the desired heat resistance, mechanical strength, toughness, thickness accuracy, and the like.

Note that the average thickness of each of the prepregs is determined by measuring the thickness of the thermal insulation material at eight arbitrary points using calipers or a micrometer, calculating the arithmetic mean value T (mm) thereof, observing the cross section of the thermal insulation material to determine the number n of prepregs stacked, and calculating the value T/n.

When producing the thermal insulation material according to one embodiment of the invention, the prepregs are preferably hot-pressed so that the compression ratio of the prepregs is 15 to 50%, more preferably 15 to 33%, further more preferably 21 to 29%, and still more preferably 22 to 27%.

When the prepregs are hot-pressed when producing the thermal insulation material according to one embodiment of the invention so that the compression ratio of the prepregs is within the above range, the prepregs can be hot-pressed to have the desired thickness, and the desired heat resistance, mechanical strength, toughness, thickness accuracy, and the like can be easily obtained.

Note that the compression ratio of the prepregs due to hot pressing refers to a value calculated using the following expression.

Compression ratio (%)=(average thickness (mm) of prepreg after hot pressing/average thickness (mm) of prepreg subjected to hot pressing (before hot pressing))×100

The density of the thermal insulation material according to one embodiment of the invention is preferably 800 to 1,650 kg/m$^3$, further more preferably 900 to 1,250 kg/m$^3$, and still more preferably 1,000 to 1,100 kg/m$^3$.

Note that the term "density" used herein in connection with the thermal insulation material refers to a value calculated from the volume (m$^3$) and the weight (kg) of a specimen prepared by cutting the thermal insulation material to have a length of 120 mm, a width of 40 mm, and the same thickness as that of the thermal insulation material.

The thermal insulation material according to one embodiment of the invention preferably has heat resistance that ensures that cracks and breakage (chipping) do not occur when the thermal insulation material is heated at 200° C. for 24 hours in air. The thermal insulation material according to one embodiment of the invention more preferably has heat resistance that ensures that cracks and breakage (chipping) do not occur when the thermal insulation material is heated at 260° C. for 24 hours in air.

The thermal conductivity of the thermal insulation material according to one embodiment of the invention is preferably 0.25 W/(m·K) or less, more preferably 0.18 W/(m·K) or less, and still more preferably 0.12 W/(m·K) or less.

When the thermal conductivity of the thermal insulation material according to one embodiment of the invention is within the above range, the thermal insulation material exhibits the desired thermal insulation capability.

Note that the term "thermal conductivity" used herein in connection with the thermal insulation material refers to a value measured in accordance with JIS A 1412-2:1999 (Part 2: Heat flow meter apparatus)

The bending strength of the thermal insulation material according to one embodiment of the invention is preferably 30 MPa or more, more preferably 45 MPa or more, and still more preferably 70 MPa or more.

Note that the term "bending strength" used herein refers to a value measured in accordance with JIS C 2210:1975 (fiber-reinforced resin bending test).

The thermal insulation material according to one embodiment of the invention is produced by hot-pressing a plurality of prepregs in a state in which the plurality of prepregs are stacked. Since the prepregs include the heat-resistant paper having a small thickness as a base, the prepregs also have a small thickness, and the thermosetting resin is homogeneously dispersed in the prepregs. It is considered that the prepregs are thus uniformly hot-pressed while the occurrence of uneven heating (i.e., a variation in heating temperature) is suppressed to produce the thermal insulation material according to one embodiment of the invention.

It is considered that the thermal insulation material according to one embodiment of the invention thus exhibits excellent bending strength as compared with a thermal insulation material that includes a fibrous material and a thermosetting resin in the same amounts as those of the thermal insulation material according to one embodiment of the invention.

The Charpy impact value of the thermal insulation material according to one embodiment of the invention measured in accordance with JIS K 6911 is preferably 10 kJ/m$^2$ or more, more preferably 25 kJ/m$^2$ or more, and still more preferably 29 kJ/m$^2$ or more.

When the Charpy impact value of the thermal insulation material is within the above range, the thermal insulation material exhibits sufficient toughness.

The thermal insulation material according to one embodiment of the invention preferably has a thickness accuracy in which the difference in thickness when measuring the thickness of the thermal insulation material at eight arbitrary points using calipers is ±5 mm or less, more preferably ±3 mm or less, further more preferably ±1 mm or less, even more preferably ±0.1 mm or less, and still more preferably ±0.05 mm or less.

The thermal insulation material according to one embodiment of the invention is produced by hot-pressing a plurality of prepregs in a state in which the plurality of prepregs are stacked. Since the prepregs include the heat-resistant paper having a small thickness as a base, the prepregs also have a small thickness, and the thermosetting resin is homogeneously dispersed in the prepregs. It is considered that the prepregs are thus uniformly hot-pressed while the occurrence of uneven heating (i.e., a variation in heating temperature) is suppressed to produce the thermal insulation material according to one embodiment of the invention.

It is considered that the thermal insulation material according to one embodiment of the invention thus exhibits excellent working accuracy and excellent thickness accuracy as compared with a thermal insulation material that is obtained by pressing a mat-shaped material.

The thermal insulation material according to one embodiment of the invention can provide a thermal insulation material that exhibits good workability, excellent heat resistance, excellent mechanical strength, excellent toughness, excellent working accuracy, excellent thickness accuracy, and the like.

A method for producing a thermal insulation material (hereinafter may be referred to as "production method") according to one embodiment of the invention is described below.

The method for producing a thermal insulation material according to one embodiment of the invention includes: stacking a plurality of prepregs obtained by impregnating heat-resistant paper with a thermosetting resin, each of the plurality of prepregs including 32 to 64 mass % of a fibrous material and 36 to 68 mass % of the thermosetting resin, and having an average thickness of 0.2 to 6 mm; and hot-pressing the plurality of prepregs at a temperature equal to or higher than the curing temperature of the thermosetting resin.

The details of the heat-resistant paper, the thermosetting resin, and the prepregs used in connection with the production method according to one embodiment of the invention are the same as described above.

The number of prepregs that are hot-pressed (i.e., the number of prepregs included in the resulting thermal insulation material) when implementing the production method according to one embodiment of the invention is not particularly limited. The prepregs are preferably hot-pressed so that the number of prepregs per 10 mm (thickness) of the thermal insulation material is 3 to 200, more preferably 10 to 200, further more preferably 30 to 100, even more preferably 30 to 80, still more preferably 40 to 80, and particularly preferably 40 to 60.

When implementing the production method according to one embodiment of the invention, the prepregs are preferably hot-pressed so that each of the prepregs has an average thickness of 0.05 to 3.0 mm, more preferably 0.05 to 0.28 mm, further more preferably 0.18 to 0.25 mm, and still more preferably 0.20 to 0.23 mm.

When the prepregs are hot-pressed so that each of the prepregs has an average thickness within the above range, it is possible to produce a thermal insulation material that exhibits excellent workability, and exhibits the desired heat resistance, mechanical strength, toughness, thickness accuracy, and the like.

When implementing the production method according to one embodiment of the invention, the prepregs are preferably hot-pressed so that the compression ratio of the prepregs is 15 to 50%, more preferably 15 to 33%, further more preferably 21 to 29%, and still more preferably 22 to 27%.

When the prepregs are hot-pressed so that the compression ratio of the prepregs is within the above range, the prepregs can be hot-pressed to have the desired thickness, and the desired heat resistance, mechanical strength, toughness, thickness accuracy, and the like can be easily obtained while achieving excellent workability.

When implementing the production method according to one embodiment of the invention, the prepregs are hot-pressed at a temperature equal to or higher than the curing temperature of the thermosetting resin included in the prepregs. For example, the prepregs are preferably hot-pressed at 100 to 200° C., more preferably 130 to 180° C., and still more preferably 145 to 155° C.

When implementing the production method according to one embodiment of the invention, the prepregs may be hot-pressed for an arbitrary time as long as the thermosetting resin included in the prepregs can be thermally cured. For example, the prepregs are preferably hot-pressed for 30 minutes or more, more preferably 60 minutes or more, and still more preferably 120 minutes or more.

When implementing the production method according to one embodiment of the invention, the hot-pressed product may optionally be machined, and may optionally be post-cured by appropriately heating the hot-pressed product to a given temperature.

Figure 2:
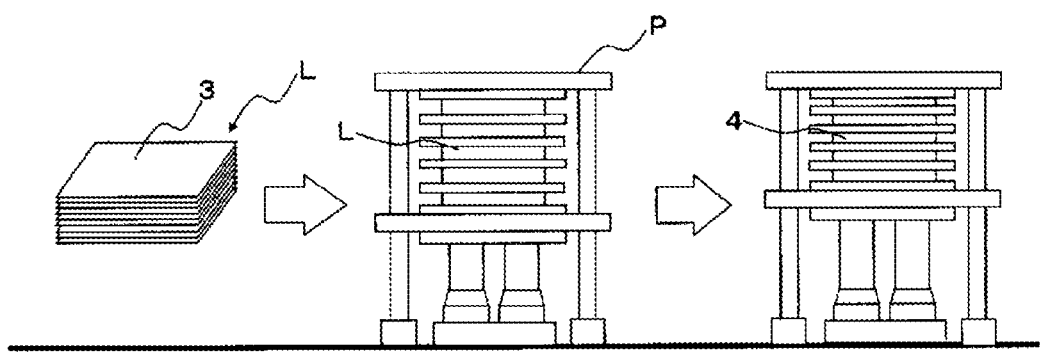
FIG. 2 is a schematic view illustrating an example of a process that produces a thermal insulation material according to one embodiment of the invention.

FIG. 2 is a schematic view illustrating an example of the production method according to one embodiment of the invention.

In the example illustrated in FIG. 2, the desired number of prepregs 3 produced by impregnating the heat-resistant paper with the thermosetting resin are stacked to form five laminates L. The five laminates L are placed between press plates of a press P in a state in which a spacer is provided between the laminates L. The laminates L are hot-pressed at a temperature equal to or higher than the curing temperature of the thermosetting resin included in the prepregs so that each prepreg has the desired average thickness to obtain the desired thermal insulation material 4.

In the example illustrated in FIG. 2, the five laminates L are hot-pressed in a state in which the laminates L are stacked. The laminates L may be hot-pressed in a state in which about 1 to 20 laminates L are stacked.

The production method according to one embodiment of the invention thus produces a thermal insulation material.

The details of the thermal insulation material produced using the production method according to one embodiment of the invention are the same as described above in connection with the thermal insulation material according to one embodiment of the invention.

The production method according to one embodiment of the invention hot-presses a plurality of prepregs a state in which the plurality of prepregs are stacked. Since the prepregs include the heat-resistant paper having a small thickness as a base, it is considered that the thermosetting resin can be homogeneously dispersed in the prepregs, and the prepregs can be hot-pressed while suppressing the occurrence of uneven heating (i.e., a variation in heating temperature).

It is considered that the production method according to one embodiment of the invention can thus produce a thermal insulation material that exhibits good workability, excellent bending strength, excellent toughness, excellent working accuracy, excellent thickness accuracy, and the like as compared with a thermal insulation material that includes a fibrous material and a thermosetting resin in the same amounts as those of the thermal insulation material produced using the production method according to one embodiment of the invention.

The embodiments of the invention can thus provide a thermal insulation material that exhibits good workability, excellent heat resistance, excellent mechanical strength, excellent toughness, excellent working accuracy, excellent thickness accuracy, and the like, and a method that can easily produce the thermal insulation material.

EXAMPLES

The invention is further described below by way of examples. Note that the following examples are for illustration purposes only, and the invention is not limited to the following examples.

Example 1

(1) Production of Prepreg

A prepreg was produced using the apparatus illustrated in FIG. 1. Specifically, paper made of glass fibers (average thickness: 0.78 mm, basis weight: 110 g/m$^2$) (heat-resistant paper 1) that was wound around the holder H was drawn using the roller, immersed in a resol-type phenolic resin (curing temperature: 150° C.) (thermosetting resin 2) put in the impregnation tank T, dried at 60 to 130° C. using the drier D, and cut using the cutter C to produce a plurality of prepregs 3 including 42 mass % of a fibrous material (derived from the paper made of glass fibers) and 50 mass % of the resol-type phenolic resin, and having an average thickness of 0.84 mm, a basis weight of 220 g/m$^2$, a length of 2,110 mm, and a width of 1,050 mm.

(2) Production of Thermal Insulation Material

Five laminates L were respectively obtained by stacking fifty-seven prepregs 3 produced as described above (see "(1) Production of prepreg"). The five laminates L were placed between the press plates of the press P in a state in which the spacer was provided between the laminates L (see FIG. 2). The laminates L were hot-pressed at 150° C. for 2 hours so that each prepreg had an average thickness of 0.21 mm to obtain a thermal insulation material 4 having a length of 2,070 mm, a width of 1,020 mm, and a thickness of 12 mm.

The resulting thermal insulation material 5 included 42 mass % of the fibrous material (derived from the paper made of glass fibers) and 50 mass % of the resol-type phenolic resin, had a density of 1,050 kg/m$^3$, had heat resistance that ensures that cracks and breakage (chipping) do not occur when the thermal insulation material is heated at 200° C. for 24 hours in air, had a thermal conductivity of 0.12 W/(m·K), a bending strength of 60 MPa, and a Charpy impact value measured in accordance with JIS K 6911 of 29 kJ/m$^2$, had a thickness accuracy in which the difference in thickness when measuring the thickness of the thermal insulation material at eight arbitrary points using calipers was 0.2 mm or less, and had excellent workability and excellent working accuracy (i.e., the thermal insulation material could be easily cut without causing cracks, breakage (chipping), and the like).

Example 2

A thermal insulation material 4 having a length of 2,070 mm, a width of 1,020 mm, and a thickness of 22 mm was obtained in the same manner as in Example 1 (see "(2) Production of thermal insulation material"), except that five laminates L were respectively obtained by stacking one hundred and five prepregs 3, and hot-pressed at 150° C. for 2 hours so that each prepreg had an average thickness of 0.21 mm.

The resulting thermal insulation material 5 included 42 mass % of the fibrous material (derived from the paper made of glass fibers) and 50 mass % of the resol-type phenolic resin, had a density of 1,050 kg/m$^3$, had heat resistance that ensures that cracks and breakage (chipping) do not occur when the thermal insulation material is heated at 200° C. for 24 hours in air, had a thermal conductivity of 0.12 W/(m·K), a bending strength of 60 MPa, and a Charpy impact value measured in accordance with JIS K 6911 of 29 kJ/m$^2$, had a thickness accuracy in which the difference in thickness when measuring the thickness of the thermal insulation material at eight arbitrary points using calipers was 0.2 mm or less, and had excellent workability and excellent working accuracy (i.e., the thermal insulation material could be easily cut without causing cracks, breakage (chipping), and the like).

Example 3

A thermal insulation material 4 having a length of 2,070 mm, a width of 1,020 mm, and a thickness of 28 mm was obtained in the same manner as in Example 1 (see "(2) Production of thermal insulation material"), except that five laminates L were respectively obtained by stacking one hundred and thirty-three prepregs 3, and hot-pressed at 150° C. for 2 hours so that each prepreg had an average thickness of 0.21 mm.

The resulting thermal insulation material 5 included 42 mass % of the fibrous material (derived from the paper made of glass fibers) and 50 mass % of the resol-type phenolic resin, had a density of 1,050 kg/m$^3$, had heat resistance that ensures that cracks and breakage (chipping) do not occur when the thermal insulation material is heated at 200° C. for 24 hours in air, had a thermal conductivity of 0.12 W/(m·K), a bending strength of 60 MPa, and a Charpy impact value measured in accordance with JIS K 6911 of 29 kJ/m$^2$, had a thickness accuracy in which the difference in thickness when measuring the thickness of the thermal insulation material at eight arbitrary points using calipers was 0.3 mm or less, and had excellent workability and excellent working accuracy (i.e., the thermal insulation material could be easily cut without causing cracks, breakage (chipping), and the like).

The thermal insulation materials obtained in Examples 1 to 3 were produced by hot-pressing a plurality of prepregs (obtained by impregnating the heat-resistant paper with the thermosetting resin) in a state in which the plurality of prepregs were stacked, and included the fibrous material (derived from the heat-resistant paper) and the thermosetting resin in a given ratio. Therefore, the fibrous material was homogeneously dispersed (included) in the thermosetting resin, and the thermal insulation materials exhibited good workability, excellent heat resistance, excellent mechanical strength, excellent toughness, excellent working accuracy, excellent thickness accuracy, and the like.

INDUSTRIAL APPLICABILITY

The embodiments of the invention can thus provide a thermal insulation material that exhibits good workability, excellent heat resistance, excellent mechanical strength, excellent toughness, excellent thickness accuracy, and the like, and a method that can easily produce the thermal insulation material.

REFERENCE SIGNS LIST

1 Heat-resistant paper
2 Thermosetting resin
3 Prepreg
4 Thermal insulation material
C Cutter
D Drier
H Holder
T Impregnation tank
L Laminates
P Press

The invention claimed is:

1. A thermal insulation material produced by hot-pressing a plurality of prepregs in a state in which the plurality of prepregs are stacked, each of the plurality of prepregs comprising heat-resistant paper impregnated with a thermosetting resin, the thermal insulation material comprising 32 to 64 mass % of a fibrous material and 36 to 68 mass % of the thermosetting resin and having a density of 800 to 1650 kg/m$^3$, wherein the heat-resistant paper is paper made of glass fibers.

2. The thermal insulation material according to claim 1, the thermal insulation material being produced by hot-pressing the plurality of prepregs so that each of the plurality of prepregs has an average thickness of 0.05 to 3.0 mm.

3. The thermal insulation material according to claim 1, wherein the plurality of prepregs are hot-pressed so that a number of prepregs stacked per 10 mm (thickness) of the thermal insulation material is 3 to 200.

4. The thermal insulation material according to claim 1, having a thermal conductivity of 0.25 W/(m·K) or less.

5. A method for producing a thermal insulation material according to claim 1 comprising: stacking a plurality of prepregs obtained by impregnating heat-resistant paper with a thermosetting resin, each of the plurality of prepregs comprising 32 to 64 mass % of a fibrous material and 36 to 68 mass % of the thermosetting resin, and having an average thickness of 0.2 to 6 mm; and hot-pressing the plurality of prepregs at a temperature equal to or higher than a curing temperature of the thermosetting resin.

6. The method for producing a thermal insulation material according to claim 5, wherein the plurality of prepregs are hot-pressed so that each of the plurality of prepregs has an average thickness of 0.05 to 3.0 mm.

7. The method for producing a thermal insulation material according to claim 5, wherein the heat-resistant paper is paper made of glass fibers.

8. The method for producing a thermal insulation material according to claim 5, wherein the plurality of prepregs are stacked so that a number of prepregs per 10 mm (thickness) of the thermal insulation material is 3 to 200.

9. The thermal insulation material according to claim 2, wherein the plurality of prepregs are hot-pressed so that a number of prepregs stacked per 10 mm (thickness) of the thermal insulation material is 3 to 200.

10. The thermal insulation material according to claim 1, wherein the plurality of prepregs are hot-pressed so that a number of prepregs stacked per 10 mm (thickness) of the thermal insulation material is 3 to 200.

11. The thermal insulation material according to claim 2, having a thermal conductivity of 0.25 W/(m·K) or less.

12. The thermal insulation material according to claim 1, having a thermal conductivity of 0.25 W/(m·K) or less.

13. The thermal insulation material according to claim 3, having a thermal conductivity of 0.25 W/(m·K) or less.

14. The method for producing a thermal insulation material according to claim 6, wherein the heat-resistant paper is paper made of glass fibers.

15. The method for producing a thermal insulation material according to claim 6, wherein the plurality of prepregs are stacked so that a number of prepregs per 10 mm (thickness) of the thermal insulation material is 3 to 200.

16. The method for producing a thermal insulation material according to claim 7, wherein the plurality of prepregs are stacked so that a number of prepregs per 10 mm (thickness) of the thermal insulation material is 3 to 200.

17. The thermal insulation material according to claim 1, wherein the content of said glass fibers in the heat-resistant paper is 82 to 88 mass % of said paper.

* * * * *